(12) United States Patent
Yoshida et al.

(10) Patent No.: US 6,193,312 B1
(45) Date of Patent: Feb. 27, 2001

(54) SEATING BOARD FOR CHILD OCCUPANT AND CHILD SEAT

(75) Inventors: Junichi Yoshida; Osamu Nakagawa, both of Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/375,799

(22) Filed: Aug. 17, 1999

(30) Foreign Application Priority Data

Aug. 28, 1998 (JP) .................................................. 10-243544

(51) Int. Cl.[7] ...................................................... A47C 1/08
(52) U.S. Cl. ................................... 297/256.16; 297/250.1
(58) Field of Search ........................... 297/250.1, 256.16, 297/256.17, 130, 283.1, 452.22, 3, 251, 467, 118

(56) References Cited

U.S. PATENT DOCUMENTS

| | | | |
|---|---|---|---|
| 1,693,166 | * | 11/1928 | Walcom . |
| 3,547,489 | * | 12/1970 | Grieser . |
| 3,712,670 | * | 1/1973 | Svehla et al. . |
| 4,099,770 | * | 7/1978 | Elsholz et al. . |
| 4,231,613 | * | 11/1980 | Jonasson et al. . |
| 4,275,923 | * | 6/1981 | Molnar . |
| 4,540,218 | * | 9/1985 | Thomas . |
| 4,867,504 | * | 9/1989 | Johnson, Jr. . |
| 5,277,472 | * | 1/1994 | Freese et al. . |
| 5,697,671 | * | 12/1997 | Shavitz . |
| 5,797,654 | * | 8/1998 | Stroud . |

FOREIGN PATENT DOCUMENTS

| | | | |
|---|---|---|---|
| 3536206 | * | 4/1987 | (DE) . |
| 3643540 | * | 6/1988 | (DE) . |

* cited by examiner

*Primary Examiner*—Milton Nelson, Jr.
(74) *Attorney, Agent, or Firm*—Kanesaka & Takeuchi

(57) ABSTRACT

A seating board includes a board portion having a first surface on which a child with a small body is to be seated, and a second surface on which a child with a body larger than the small body is to be seated, which is located on a side opposite to the first surface. Clamp arms are attached to the board portion for attaching the seating board to a seat portion of a child seat. When the seating board is detached from the child seat, the child seat becomes a state suitable for a child larger than the infant. In case the seating board is disposed directly on a vehicle seat, the seating board becomes suitable for a middle size child. Thus, the seating board can be used for child occupants with various sizes.

8 Claims, 7 Drawing Sheets

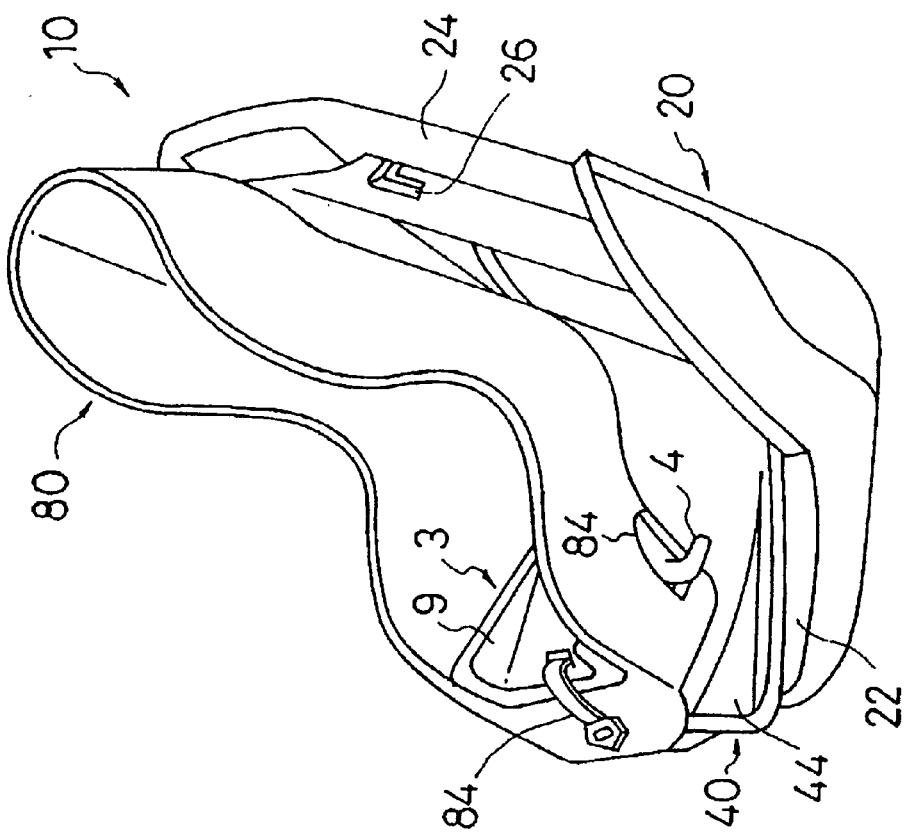
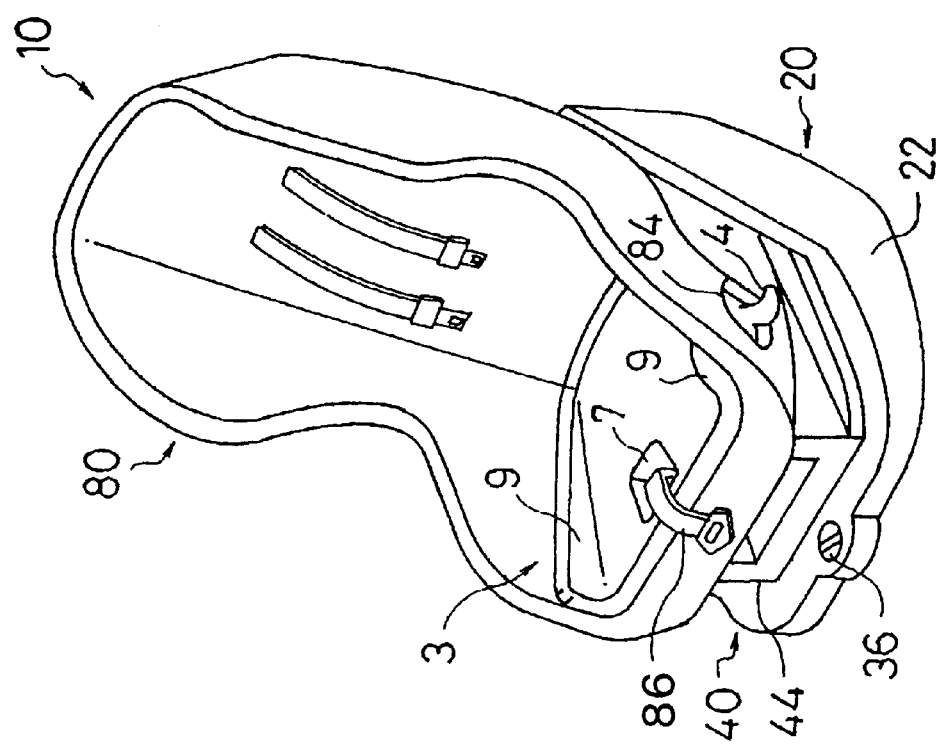

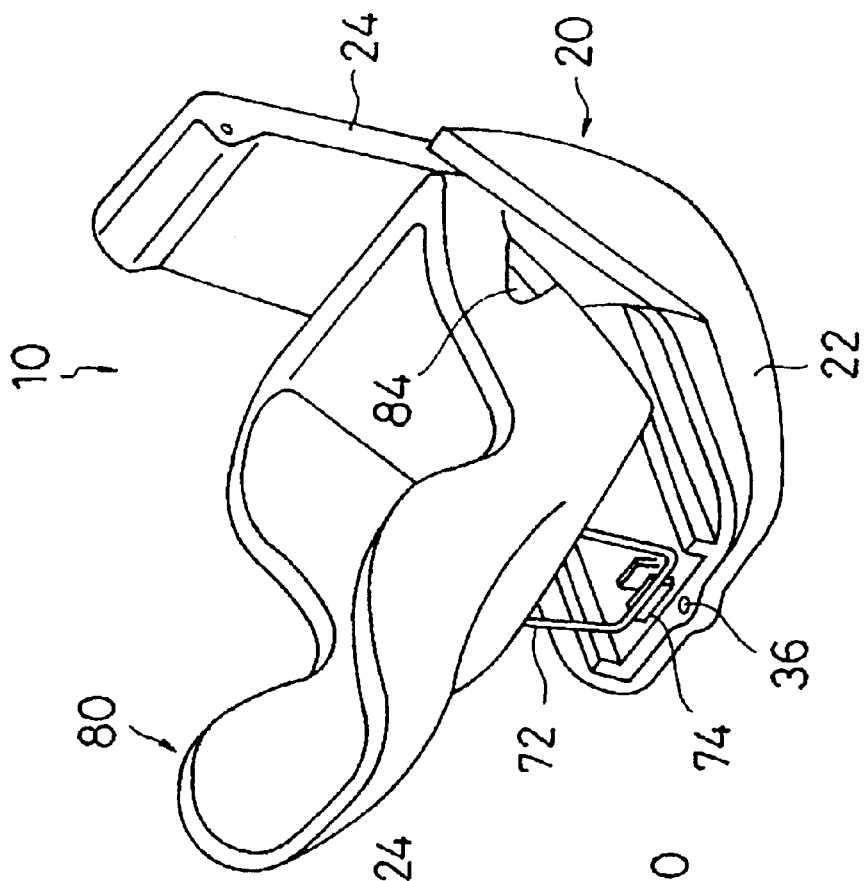
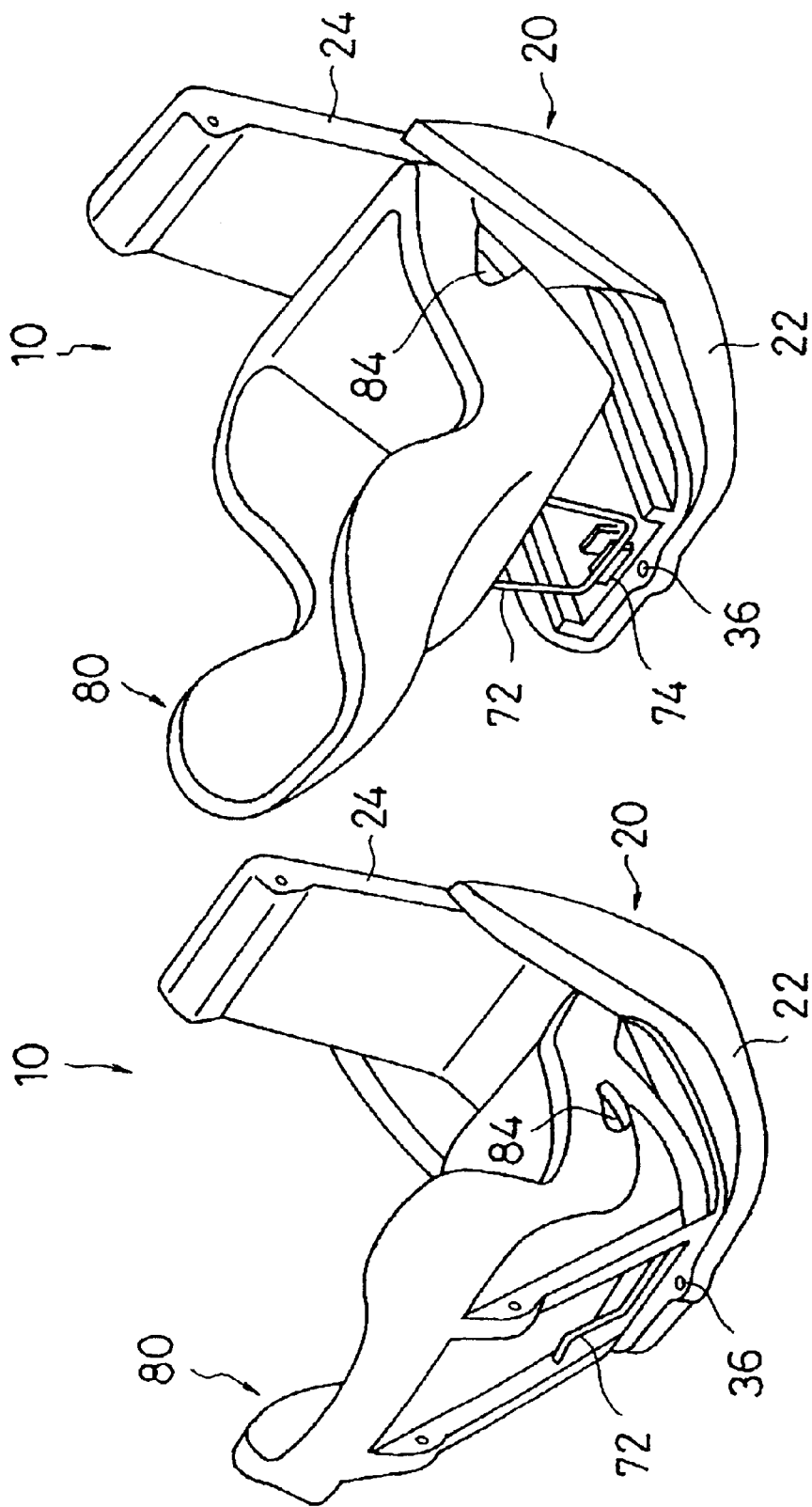

SEATING BOARD FOR CHILD OCCUPANT AND CHILD SEAT

BACKGROUND OF THE INVENTION AND RELATED ART STATEMENT

The present invention relates to a seating board on which a child occupant in a vehicle is seated and, more particularly, to a seating board which can be adapted to either a child seat or a vehicle seat in an automobile. Further, the present invention relates to a child seat provided with the seating board.

Child seats are widely used for protecting child occupants. There is a type of a child seat in which the height of a squab or seating portion is adjustable so that the child seat can be used even when the child grows.

There may be a situation such that a body of a child is too large to be seated in a child seat but too small to be seated directly on a vehicle seat. For the child having the above body size (hereinafter, referred to as "medium size child"), it may be considered that a child seat having a size larger than that of the existing normal child seat is made, but the large child seat is not suitable for a child having a small body size.

Also, it is not enough if only the height of a squab or seating portion is adjustable, because the width of the squab is not adjustable.

It is an object of the present invention to provide a seating board which can be adapted to child occupants with various sizes and to provide a child seat provided with the aforementioned seating board.

It is another object of the invention to provide a seating board as stated above, wherein the seating board can be attached to the child seat or used alone.

Further objects and advantages of the invention will be apparent from the following description of the invention.

SUMMARY OF THE INVENTION

A seating board for a child occupant of the present invention is a board or has a board portion, which comprises a first surface on which a child having a relatively small body is seated and a second surface on which a child having a relatively large body is seated, the second surface being located on the opposite side of the first surface. The seating board is provided with clamp arms for attaching the seating board to a seat portion of a child seat.

When the seating board is attached to the seat portion of the child seat, the child seat can be used for seating a child or infant having a quite small body thereon. When the child body becomes larger according to the growth of the child, the seating board is removed from the child seat, so that the child seat becomes suitable for the grown child.

When the child further grows to be a medium size child, i.e. too large to be seated in a child seat but too small to be seated directly on a vehicle seat, the seating board is mounted on a vehicle seat, so that the child is seated on the seating board.

The seating board of the present invention is provided with the clamp arms for facilitating the attachment of the seating board to the child seat. For example, the clamp arms project from both sides of the second surface.

The seating board further includes a through hole penetrating from the first surface to the second surface, through which a crotch belt of the child seat passes.

The seating board may include a seat pad on the second surface for making the seating board in a state where the through hole is covered or in a state where the through hole is opened. In addition, the seat pad may be provided with a plate capable of closing the through hole.

In the present invention, the seating board may further include side walls projecting from both right and left sides of the first surface. The side walls restrict the width of the seating area of the first surface so as to secure the small infant's hip from moving right and left.

The angle of inclination from the front to back direction of the tops of the side walls may be different from the angle of inclination from the front to back direction of the seating area of the first surface. By selecting the angle of inclination of the tops of the side walls, the angle of inclination from the front to back direction of the surface area of the second surface when the second surface is directed upward can be set at a desired angle.

A child seat of the present invention comprises a seat portion on which the seating board as explained above is arranged such that the first surface of the seating board is directed upward.

BRIEF DESCRIPTION OF THE DRAWINGS

FIG. 6(*a*) is a perspective view of the child seat according to the embodiment of the present invention in a state that a seat portion is shifted backward, and FIG. 6(*b*) is a perspective view of the child seat in a state that the seat portion is shifted forward;

FIG. 7(*a*) is a perspective view of the child seat in which the seat portion is rotated by 180 degrees from the state shown in FIG. 6(*b*), and FIG. 7(*b*) is a perspective view of the child seat in which the seat portion is reclined from the state shown in FIG. 7(*a*)

DETAILED DESCRIPTION OF PREFERRED EMBODIMENTS

Hereinafter, an embodiment of the present invention will be described. FIGS. 1 through 5 illustrate the structure of a seating board according to the embodiment.

Figure 1A:
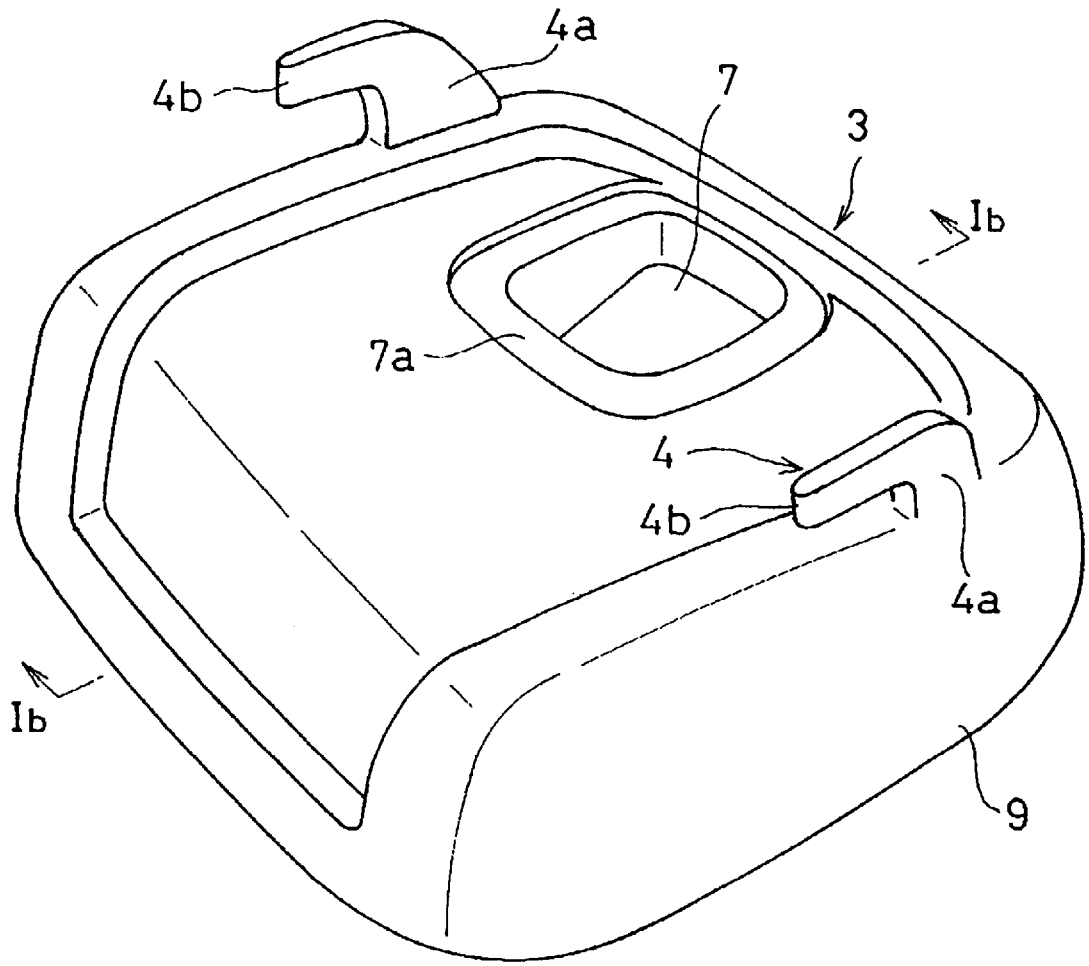
FIG. 1(*a*) is a perspective view showing a seating board according to an embodiment in a state that a second seat pad is removed, and FIG. 1(*b*) is a sectional view taken along line Ib—Ib in FIG. 1(*a*)
Figure 1B:
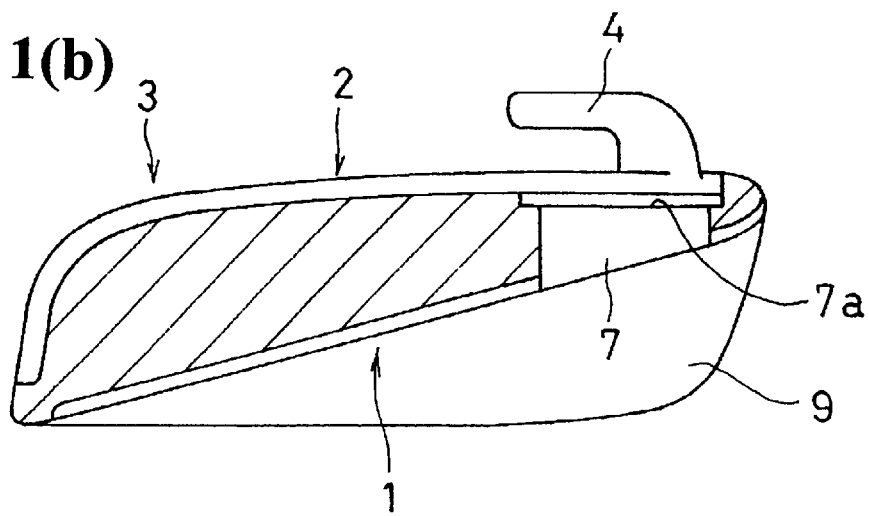
Figure 2A:
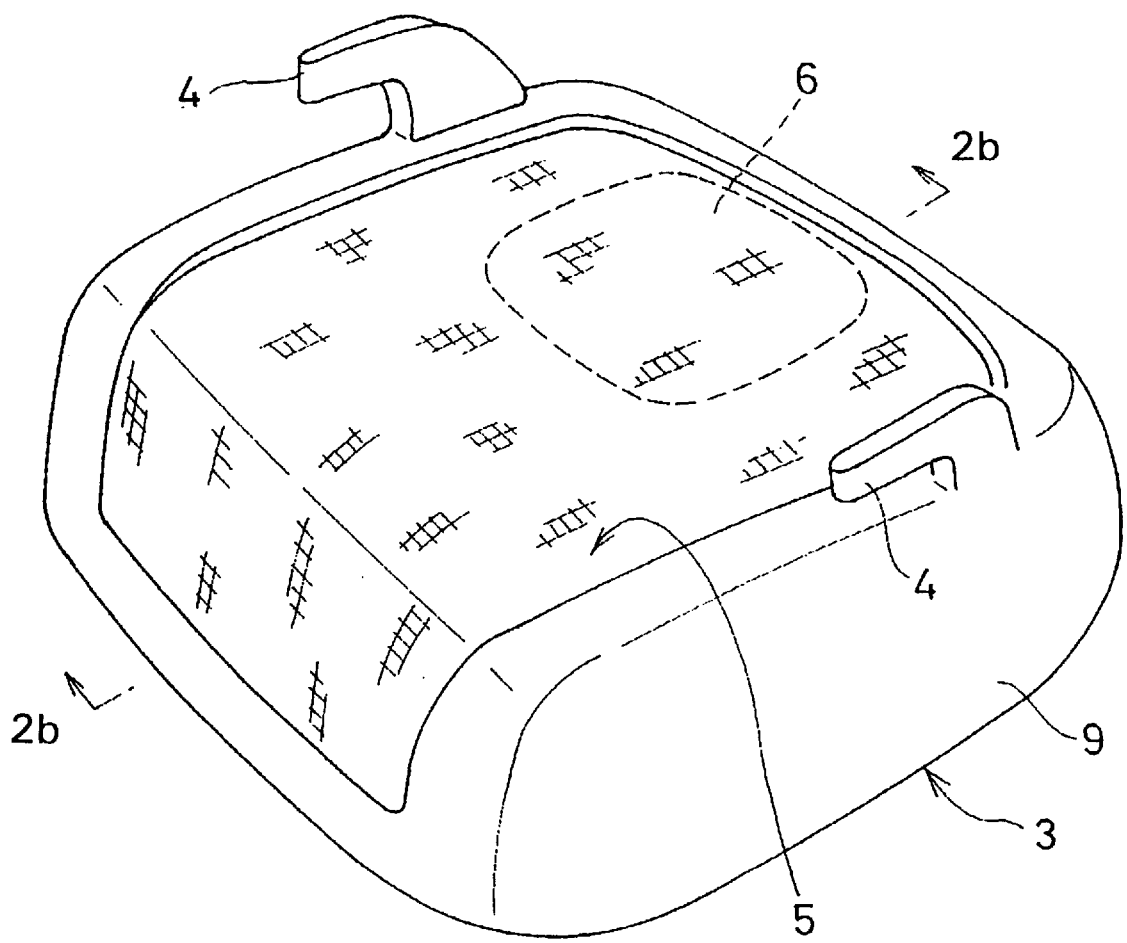
FIG. 2(*a*) is a perspective view showing the seating board according to the embodiment in a state that the second seat pad is attached, and FIG. 2(*b*) is a sectional view taken along line 2*b*—2*b* in FIG. 2(*a*)
Figure 2B:
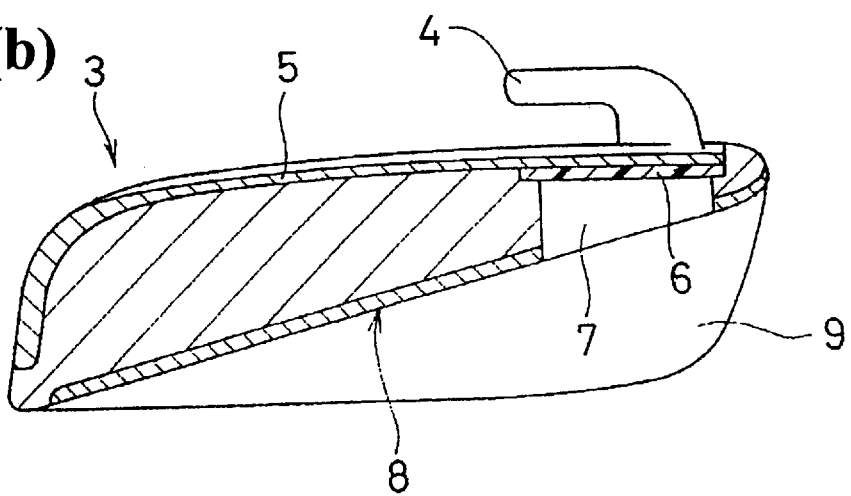
Figure 4:
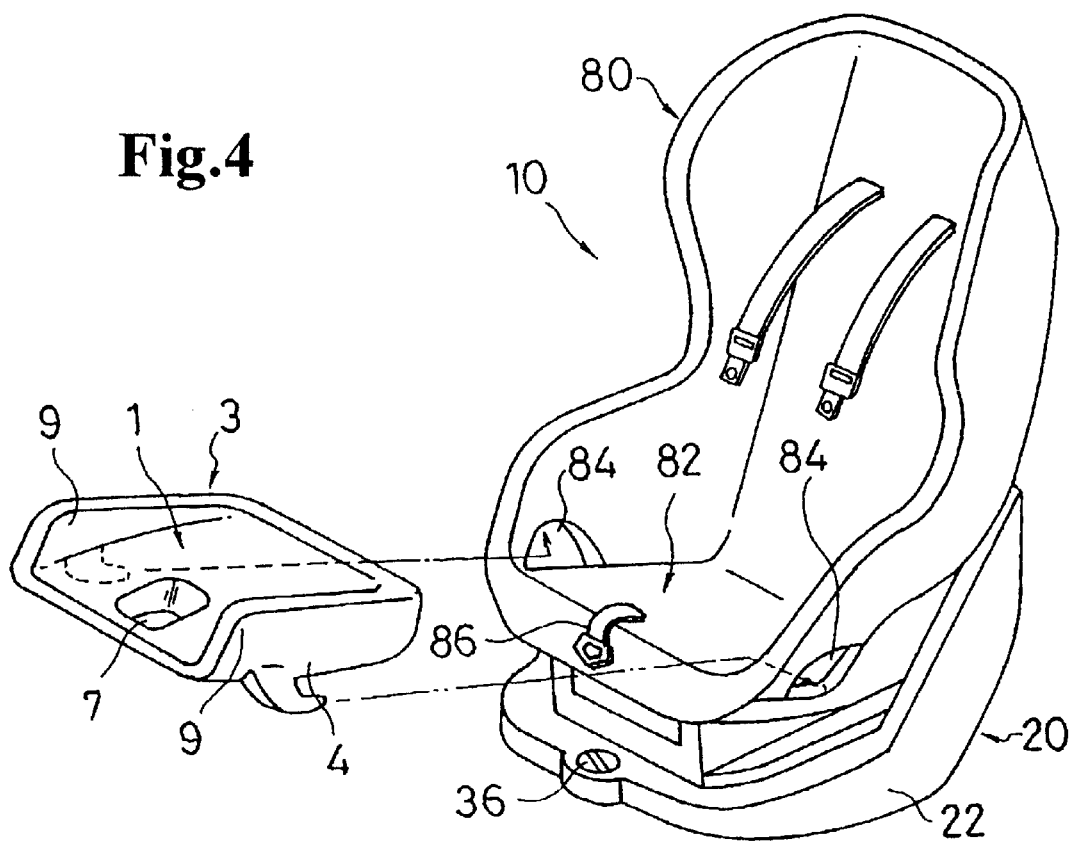
FIG. 4 is a perspective view showing the relation between the seating board and a child seat.
Figure 5:
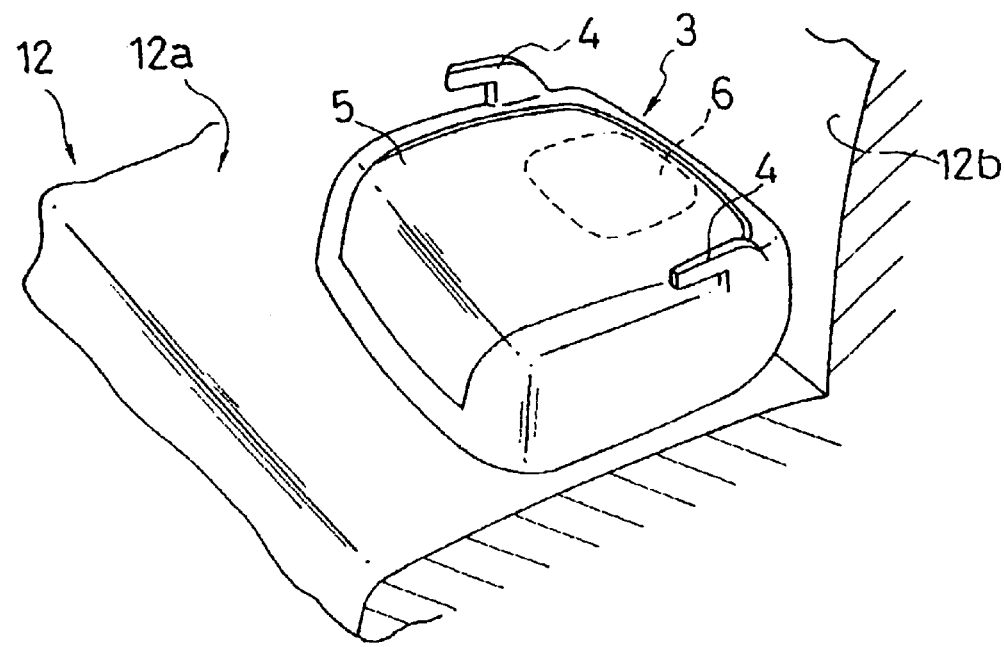
FIG. 5 is a perspective view showing a state that the seating board is mounted on a vehicle seat.
Figure 8:
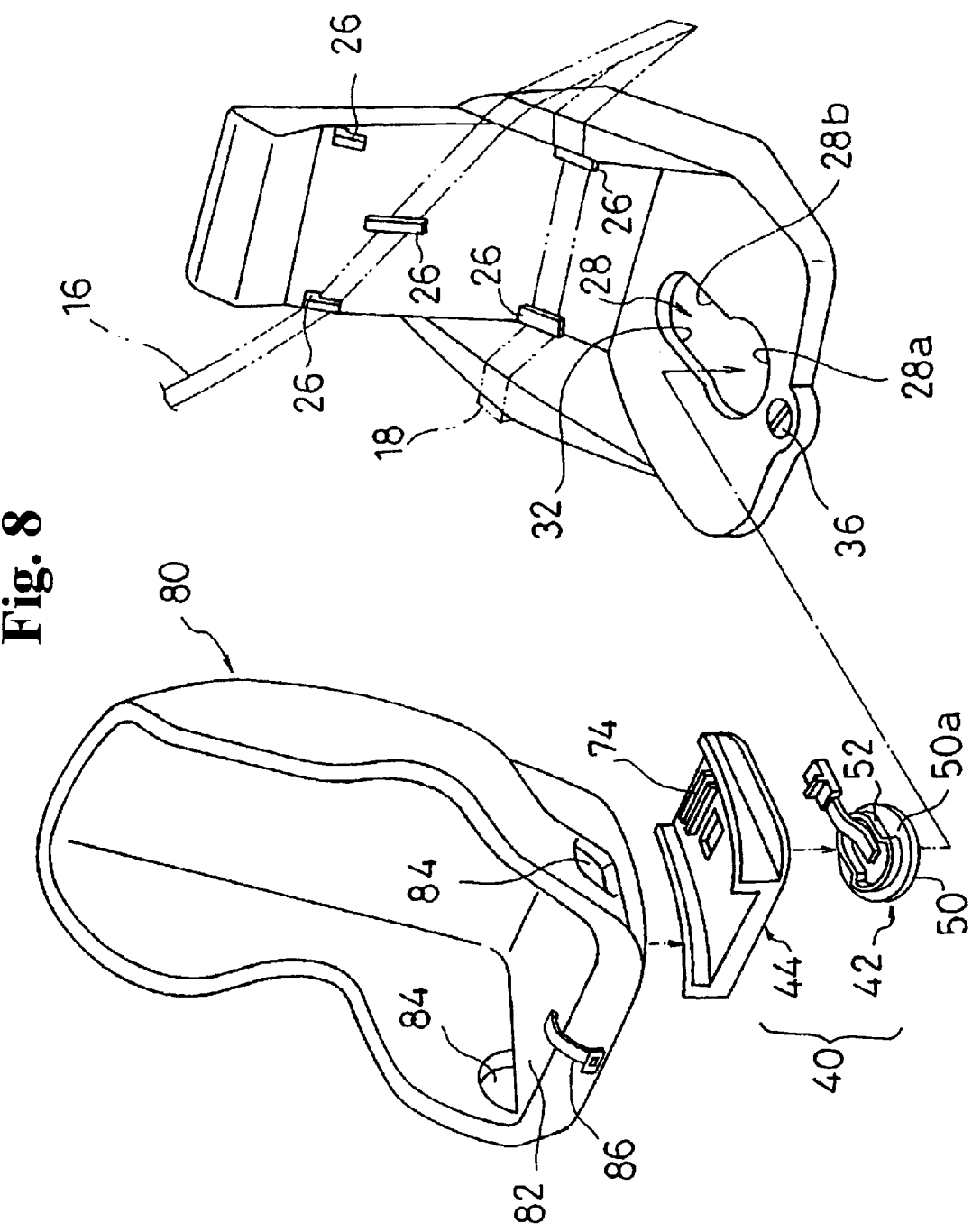
FIG. 8 is an exploded perspective view of the seat portion, a swiveling member, and a base of the child seat shown in FIGS. 6(*a*)–7(*b*).

A seating board 3 has a first surface 1 which is a lower surface in FIGS. 1(*a*)–3(*b*), and a second surface 2 which is an upper surface in FIGS. 1(*a*)–3(*b*). The seating board 3 is attached to a child seat 10 as shown in FIG. 4 or directly mounted on a vehicle seat as shown in FIG. 5. As shown in FIG. 4, the first surface 1 is a surface on which, for example, a nine-month-old or younger infant may be seated. As shown in FIG. 5, the second surface 2 is a surface on which, for example, a six-year-old to ten-year-old child may be seated.

Formed on both right and left sides of the second surface 2 are clamp arms 4. The clamp arms 4 are each formed in a L-like configuration having a base 4a projecting upwardly from the second surface 2 and a tip 4b extending substantially parallel to the second surface 2.

A second seat pad 5 is disposed from the second surface 2 to one end surface of the seating board 3. The seat pad 5 is provided with a plate 6 for closing an opening 7. The opening 7 is formed to penetrate from the first surface 1 to the second surface 2 for passing a crotch belt 86 therethrough. Formed in the second surface 2 is a shallow stepped portion 7a around the opening 7. It should be noted that a notch may be formed in the seating board, instead of the opening 7 for passing the crotch belt 86 therethrough.

A first seat pad 8 is disposed on the first surface 1. Side walls 9 are formed on both right and left sides of the first surface 1. The thickness between the first surface 1 and the second surface 2 is increased gradually toward the rear end in a condition that the front end is on the left and the rear end is on the right, as shown in FIG. 4. The opening 7 is positioned near the front end in FIG. 4.

To attach the seating board 3 to the child seat 10 as shown in FIG. 4, the first surface 1 is directed upward and the second surface 2 is directed downward. In addition, the opening 7 is positioned near the front end of the seating board 3. The seating board 3 is mounted on a seat surface 82 of the seat portion 80 of the child seat 10 and the clamp arms 4 are inserted into right and left openings 84 formed in the seat portion 80. The clamp arms 4 engage the seat portion 80 to hold the seating board 3 on the seat portion 80. At this point, the crotch belt 86 disposed at the front edge of the seat portion 80 passes through the opening 7. Accordingly, the seating board 3 is attached to the child seat 10 as shown in FIG. 6(a), so that the child seat 10 is set to be suitable for an infant having a small body. When the seating board 3 is detached from the child seat 10, the child seat 10 becomes the state suitable for a child larger than the infant.

In case the seating board 3 is disposed directly on a vehicle seat 12 as shown in FIG. 5, the seating board 3 becomes suitable for a middle size child. In this case, the seating board 3 is set such that the second surface 2 is directed upward and the clamp arms 4 are positioned at the rear side. The seating board 3 is arranged at a corner between a seat squab 12a and a seat back 12b of the vehicle seat, so that the middle size child is seated on the seating board 3.

Figure 3A:
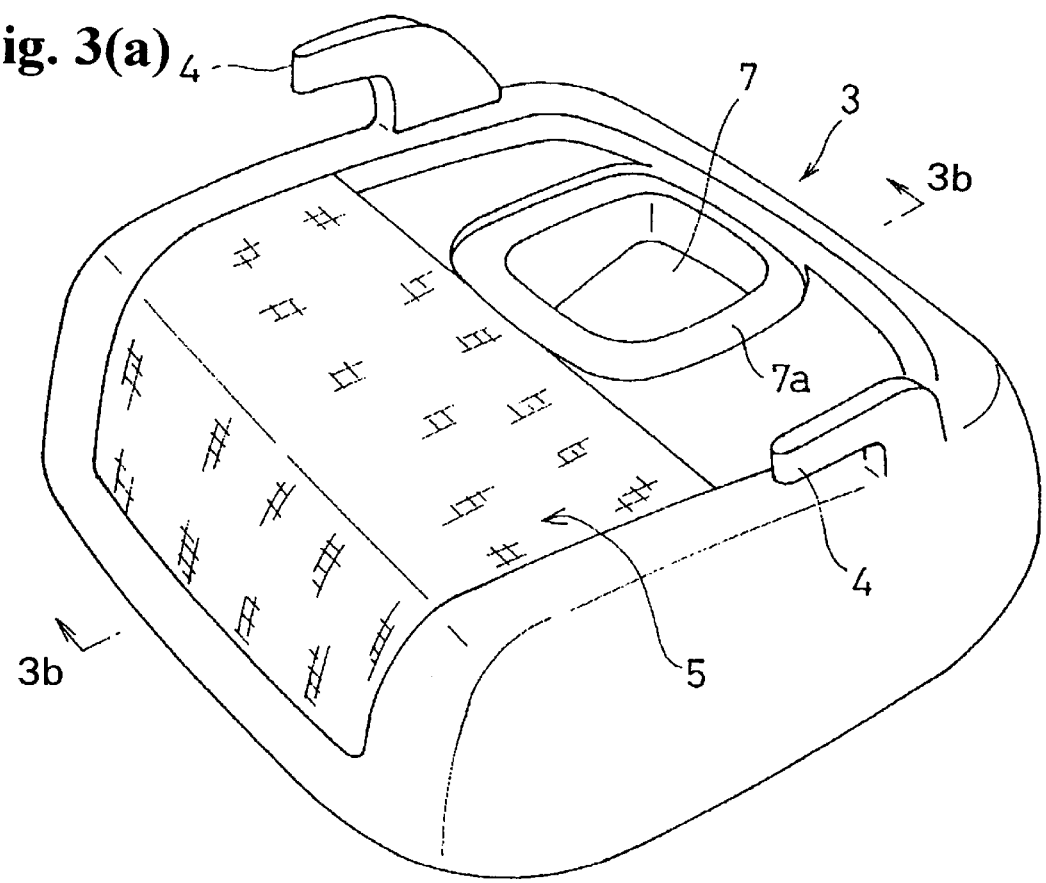
FIG. 3(*a*) is a perspective view showing the seating board according to the embodiment in a state that the second seat pad is attached, FIG. 3(*b*) is a sectional view taken along line 3*b*—3*b* in FIG. 3(*a*), and FIG. 3(*c*) is an enlarged sectional view of the second seat pad.
Figure 3B:
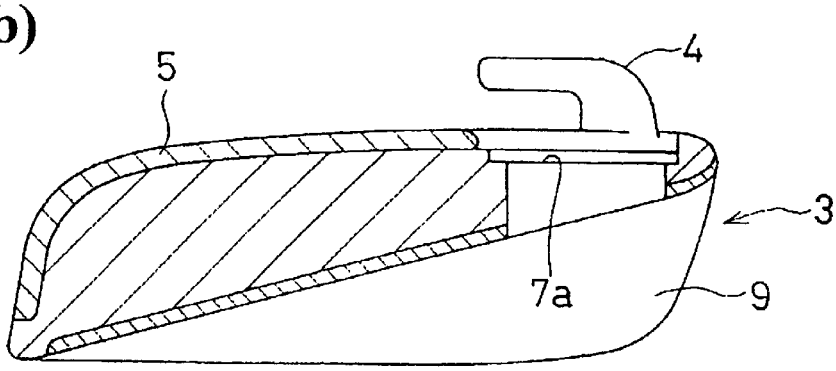
Figure 3C:
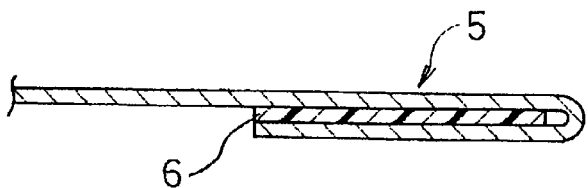

When the seating board 3 is attached to the child seat 10 as shown in FIG. 4, the second seat pad 5 is set in a state shown in FIGS. 3(a)–3(c) where the opening 7 is opened. In the state shown in FIGS. 3(a)–3(c), the seat pad 5 is tuned over, and the plate 6 is removed from the stepped portion 7a and is wrapped by the seat pad 5. The plate 6 and the seat pad 5 are detachably connected to each other by, for example, flat fasteners such as Magic Tape (Trademark). The seat pad 5 is also connected detachably to the seating board 3 by flat fasteners.

When the seating board 3 is mounted directly to the vehicle seat as shown in FIG. 5, the plate 6 is fitted to the stepped portion 7a to close the opening 7 and is covered with the seat pad 5.

Hereinafter, a description will now be made as regard to the structure of the child seat 10 with reference to FIGS. 6(a) through 8. It should be noted that the seating board 3 of the present invention can be adapted to other child seats besides the illustrated child seat 10.

The child seat 10 is secured to a vehicle seat 12 by a webbing, i.e. shoulder belt 16 and lap belt 18, of a seat belt device of a vehicle. The child seat 10 comprises a base 20, a swiveling member 40, and the seat portion 80.

The base 20 comprises a bottom 22 which is mounted on the seat squab or cushion 12a of the vehicle seat 12, and a vertical portion 24 standing from a rear portion of the bottom 22 to extend along the seat back of the vehicle seat. Arranged on a front surface of the vertical portion 24 are hooks 26 with which the webbings 16, 18 are hooked.

Formed in the upper surface of the bottom 22 is a concavity 28 into which the swiveling member 40 is engaged. As clearly shown in FIG. 8, the concavity 28 is formed to have a circular portion 28a at the front portion and an oval portion with parallel sides 28b at the rear portion thereof so as to have a keyhole-like configuration as seen from above. Arranged around the peripheral wall of the concavity 28 is an overhung portion so as to form a space between the bottom surface of the concavity 28 and the overhung portion. The space forms a guide 32 into which a flange 50a of a lower plate 42 of the swiveling member 40 enters.

Disposed on a front portion of the upper surface of the bottom 22 of the base 20 is a lock knob 36 for locking and unlocking the swiveling member 40.

The swiveling member 40 has a lower plate 42 and an upper plate 44. The lower plate 42 has a circular plate 50, a surrounding wall 52 projecting from the top surface of the circular plate 50.

The surrounding wall 52 is spaced apart from the peripheral edge of the circular plate 50 at a predetermined distance so as to form the flange 50a around the circular plate 50. The flange 50a engages the aforementioned guide 32.

To secure the child seat 10 to the vehicle seat, the lock knob 36 is turned in the clockwise direction to release the locking mechanism for shifting forward the seat portion 80 as shown in FIG. 6(b), and the webbings 16, 18 are hooked on the hooks 26 so as to fix the child seat 10 to the vehicle seat.

After the child seat 10 is fixed to the vehicle seat, the seat portion 80 facing the front is shifted backward and the lock knob 36 is turned in the counter clockwise direction opposite to the releasing operation so that the seat portion 80 is locked. In this state, the child seat 10 is usable in a condition facing forward.

To set the child seat in the state that the seat portion 80 faces backward, the seat portion 80 is rotated by 180 degrees from the state shown in FIG. 6(b) to the state shown in FIG. 7(a). Then, by a locking mechanism (not shown), the swiveling member 40 is held in a locked state where the rotation is not allowed. Therefore, the seat portion 80 is kept in the state facing backward.

When the seat portion 80 is reclined in the aforementioned state, as shown in FIG. 7(b), the lower portion of a stay 72 is fitted into a stay holder 74.

According to the child seat 10 as mentioned above, the webbings 16, 18 are allowed to be hooked on the vertical portion 24 in the state where the seat portion 80 is spaced apart from the vertical portion 24 by moving forward the seat portion 80 or further rotating the seat portion 80, thereby achieving the quite easy hooking of the webbings 16, 18 onto the hooks 26. The detailed structure of the child seat 10 is referred to in U.S. patent application Ser. No. 09/365,754 filed on Aug. 3, 1999.

The seating board 3 can be adapted to both cases where the seat portion 80 faces forward as shown in FIG. 6(a) and where the seat portion 80 faces backward as shown in FIGS. 7(a), 7(b).

As described above, according to the present invention, one seating board and/or one child seat can be used for one of children with various body sizes to seat on a vehicle seat.

While the invention has been explained with reference to the specific embodiment of the invention, the explanation is illustrative and the invention is limited only by the appended claims.

What is claimed is:

1. A seating board for a child occupant comprising:

a board portion including a first surface on which a child with a small body is to be seated, a second surface on which a child with a body larger than the small body is to be seated, said second surface being located on a side opposite to the first surface, and a through hole penetrating from the first surface to the second surface for allowing a crotch belt of the child seat to pass therethrough, a seat pad provided on the second surface for making the seating board in one of states where the through hole is covered and where the through hole is opened, said seat pad having a plate for closing the through hole, and clamp arms attached to the board portion for attaching the seating board to a seat portion of a child seat.

2. A seating board according to claim 1, wherein said clamp arms project from two lateral sides of the second surface.

3. A combination comprising a child seat, and the seating board of claim 1 arranged on the child seat such that the first surface of the seating board is directed upward.

4. A combination according to claim 3, wherein includes right and left openings into which the clamp arms are inserted, respectively.

5. A seating board according to claim 1, further comprising side walls projecting from two sides of the first surface.

6. A combination comprising a child seat and a seating board for a child occupant, said child seat comprising:

a seat portion having right and left openings, and said seating board comprising:

a board portion including a first surface on which a child with a small body is to be seated, a second surface on which a child with a body larger than the small body is to be seated, said second surface being located on a side opposite to the first surface, and side walls formed at two lateral sides of the first surface to support the small body when the small body sits on the first surface, and clamp arms for attaching the seating board to the seat portion of the child seat, said clamp arms projecting from two lateral sides of the second surface such that when the seating board is fixed to the child seat, the first surface of the seating board is directed upward and the clamp arms are inserted into the right and left openings of the seat portion to engage the seat portion.

7. A combination according to claim 6, wherein said first surface inclines rearwardly when the first surface faces upward so that a front side is higher than a rear side, and said second surface extends substantially horizontally.

8. A combination according to claim 7, wherein each said side wall has a top, an angle of inclination from a front to back direction of the top of the side wall being different from an angle of inclination from a front to back direction of the first surface, an angle of inclination from a front to back direction of the second surface when the second surface faces upward being determined by the angle of inclination of the tops of the side walls.

* * * * *